United States Patent [19]
Cain et al.

[11] Patent Number: 5,326,931
[45] Date of Patent: Jul. 5, 1994

[54] CABLE DISTRIBUTION INTERFACE UNIT

[75] Inventors: Steven L. Cain, Lilburn; Eddie Drake, Tucker; Vernon R. Miller, Atlanta, all of Ga.; Palamadi S. Vishwanath, Annapolis, Md.

[73] Assignees: The Whitaker Corporation, Wilmington, Del.; Smart House, Upper Marlboro, Md.

[21] Appl. No.: 795,589

[22] Filed: Nov. 21, 1991

[51] Int. Cl.$^5$ .................. H02G 3/10; H01R 13/66
[52] U.S. Cl. .......................... 174/48; 174/58; 439/535; 439/538
[58] Field of Search ................ 174/48, 54, 58, 59, 174/60, 64, 65 R; 220/3.5, 3.6; 439/535, 536, 538, 539, 357, 358, 719, 540

[56] References Cited

U.S. PATENT DOCUMENTS

| | | | |
|---|---|---|---|
| 1,228,731 | 6/1917 | Abbott et al. | 174/58 |
| 3,935,637 | 2/1976 | Bunnell | 174/58 X |
| 4,494,815 | 1/1985 | Brzostek et al. | 439/536 |
| 4,756,695 | 7/1988 | Lane et al. | 439/76 |
| 4,863,399 | 9/1989 | Medlin, Jr. | 439/538 |
| 5,064,387 | 11/1991 | Dale et al. | 439/535 |
| 5,101,079 | 3/1992 | Rodrigues et al. | 174/65 R |

FOREIGN PATENT DOCUMENTS

| | | | |
|---|---|---|---|
| 861125 | 1/1971 | Canada | 174/58 |
| 859649 | 12/1952 | Fed. Rep. of Germany | 174/58 |
| 1307518 | 9/1962 | France | 439/535 |

Primary Examiner—Peter Dungba Vo

[57] ABSTRACT

An electrical interface distribution unit (10) and method for interconnecting signal cables (60, 62, 64) in a cable housing (24) within a wall defined by sheets of material (16–18) spaced apart by studs (20) to define an interior wall volume wherein large numbers of cables must fit in a small volume interiorly of the wall and be interconnected by modules (70, 80) for distribution of input and output signals in a building.

11 Claims, 7 Drawing Sheets

CABLE DISTRIBUTION INTERFACE UNIT

This invention relates to an electrical interface distribution unit and method for interconnecting signal cables within a wall of a building structure or the like.

BACKGROUND OF THE INVENTION

With the advent of electronics utilized in building structures, including offices, factories, and homes, the need to mount and accommodate cables for television, data, telephone, and security or sensor devices has increased. In some instances, the cables may be wall mounted or surface mounted, but in general, such mountings are aesthetically unacceptable, and in certain instances, practically undesirable by virtue of damage to such cables by the normal traffic of the buildings, including the movement of furniture, equipment, and the like. Most wall constructions include the use of studs which are nominally of 2"×4" dimensions over which is applied drywall or paneling to result in a hollow space or volume between the sheet material defining the walls. As can be appreciated, this volume is limited in depth. Traditional practice has been to mount wall boxes or housings to accommodate cable termination to devices, to rough-wire the building while one wall is removed, through the interior wall volume, through apertures made in studs and to leave an excess of cable which may be trimmed during final installation. The practice extends to pulling the cable through the box or housing, clamping the cable to the box and terminating it to a device and then shoving it back into the box. With respect to prior practice, utilizing one or two or even three power cables, such as the so-called "Romex" cable, the ends, as terminated, can be readily, or sometimes with difficulty, fitted into a box by folding and bending, with the excess cable needed to effectively terminate the cable removed prior to termination, reducing the volume of cable which must be stuffed into the box.

With respect to applications wherein far more than two or three cables must be terminated, as for example, in the so-called distribution of television or data cables, which are coaxial in nature, and telephone cables which carry numerous wires in numbers of cables to be terminated, a problem is created. One solution employed in the prior art utilizes a fairly large box or housing of substantial interior volume to accommodate the "head end" and other cables for upstream and downstream distribution of signals through distribution cables.

Patent Application Ser. No. 07/618,766, filed Nov. 27, 1990, and directed to a convenience electrical outlet assembly represents one solution wherein power and signal outlets are combined and employed using a hybrid ribbon cable for an intelligent wiring system for a building. There, a multi-function ribbon cable is attached to a housing which has receptacles into which terminals attached to modules are plugged to effect a termination. A special module is used to accommodate data or communication cables inserted into the housing, which is fitted within a hole in the sheet material of a wall. There also, the numbers of coaxial and telephone cables are relatively limited inputs to a receptacle associated with such device. U.S. Pat. No. 4,756,695 granted Jul. 12, 1988 and drawn to a local area network interface accomplishes a similar function with respect to telephone cables. There, a wall box is made to accommodate connectors terminated to cable and plugged therein to join modules accommodated by the wall box.

The present invention has as an object the provision of a cable distribution unit and method of installation wherein relatively large numbers of cables can be accommodated in a relatively small volume within the sheet material defining a wall structure of a building. The invention has as a further object the provision of a housing and mounting arrangement which is easy to use and reduces the amount of labor for the interconnection of cables providing distribution in a building structure. Still a further object is to provide a low cost solution to the termination and distribution of cable which can readily fit within the wall of a building structure.

SUMMARY OF THE INVENTION

The present invention achieves the foregoing objects through the use of a particular housing having apertures or slots therein which extend through portions of the side walls of the housing and through the back of the housing with such slots being of a dimension to readily allow the pulling of cable through the housing and the pushing of cable back through the housing to be accommodated within the volume of the wall. The width of the slots are of such a dimension as to allow the cable alone to be inserted therethrough into the housing. However, after the connector is installed at the end of the coax cable, it will not slip out but is trapped, as the width of the connector is greater than said slot dimension. The housing further includes mounting means in the form of slots allowing the sliding engagement and mounting of electronic modules such as those used for cable signal splitting and signal combination as well as those used for telephone distribution, all within the volume of the housing. The invention contemplates a relatively large number of cables terminated for distribution and held within the housing. Cable signal splitters or combiners are arranged so that input and output connections have a common orientation so that the cables will not have to extend into a module from one side and out of the module from the other thus occupying substantial interior volume. The invention contemplates the use of modules which may be fitted back to back and, following termination, readily slid within slots interiorly of the housing with a telephone cable connector mounted on top of the modules but still within the volume of the housing. The nature and arrangement of the housing of the invention allows cable to be pulled through a hole in a sheet of material defining a wall terminated first to terminals such as coaxial connectors terminated to the electronic modules and then the housing slid into a hole in the wall with the modules then inserted in such housing, the cables sliding back through the slots into the interior of the wall. This device and the method related thereto allows for a simple installation of distribution devices, a minimum use of cable length, and still ready access and removal of electronic modules and terminals for changes, repair and additional circuits.

IN THE DRAWINGS

DETAILED DESCRIPTION OF THE INVENTION

Figure 1:
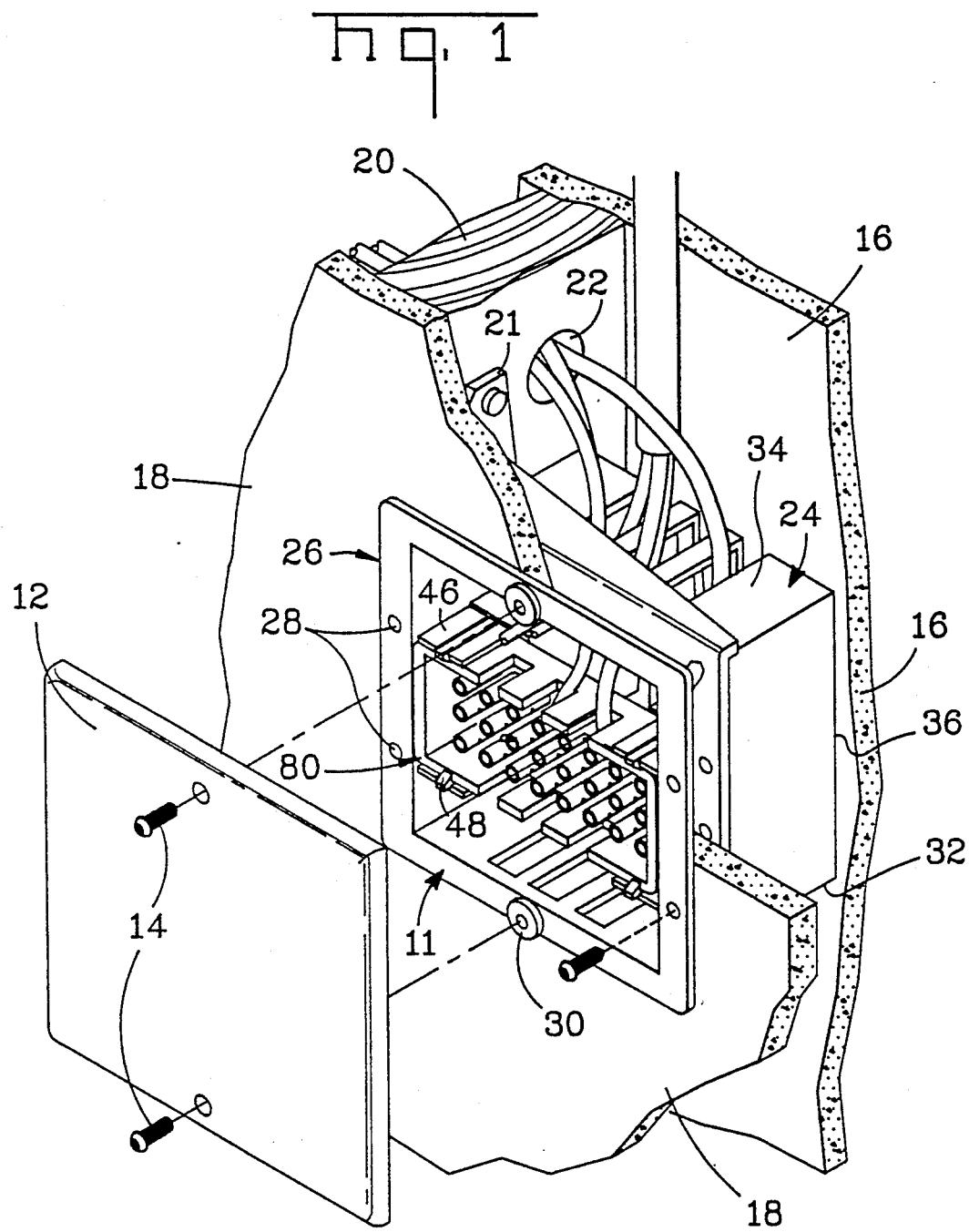
FIG. 1 is a perspective view, showing the housing of the invention, fully loaded, as installed in a wall with a cover plate expanded therefrom.

FIG. 1 shows an assembly 10 which includes a face plate 12 aligned for installation relative to a cable Distribution Interface Unit (DIU) 11 mounted in a wall. The wall construction can best be seen in FIG. 3 to include sheets of material 16 and 18 which are typically gypsum board or drywall; or plywood, in the case of an exterior wall with respect to 16, and paneling with respect sheet 18. These sheets are anchored to studs 20, one of which is shown, to form a wall structure and define an interior volume between the sheets 16 and 18 and the studs 20. In practice, with respect to an interior wall, cables to include power, telephone, television, and/or data cables are laid within the space between sheets 16 and 18 prior to one or the other of the sheets being fastened to a stud 20. The cables may be brought down from a space above a given room or, up from a space beneath a given room, or through studs by virtue of apertures such as 22 made in stud 20 and revealed in FIG. 3. In context, studs are typically 3½ inches in depth and placed on 16-inch centers.

Figure 6:
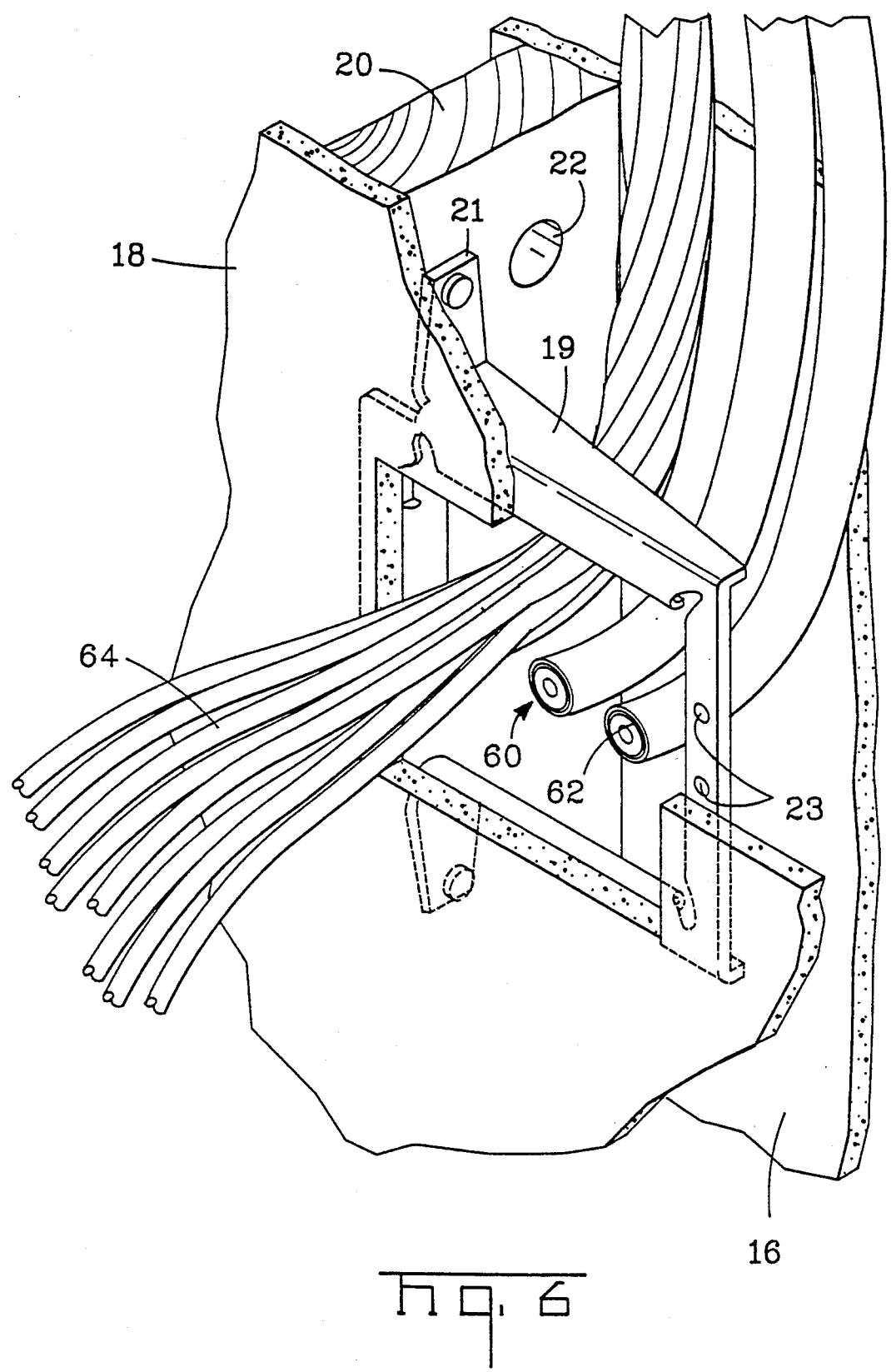
FIG. 6 is a view of cables pulled through a hole in the sheet defining a wall structure.

FIG. 6 shows coaxial cables 62 and telephone cables 64 pulled through a hole in sheet 18 and through a bracket 19 typically anchored to a stud 20 by a flange 21 and fasteners applied therethrough. The bracket 19 includes an inner opening which is used as a guide for forming the hole in sheet 18 after application of the sheet over the bracket. The bracket, see FIG. 3, includes a series of fastener apertures 23 distributed around the periphery directed to receive fasteners applied through a DIU housing 24. Housing 24 includes a flange 26 which extends therearound in the manner shown in FIGS. 1, 3, 7, and 8. This flange includes fastener apertures 28 which are aligned with the apertures 23 in bracket 19 and through which fasteners such as screws may be applied to lock the housing 24 to the bracket 19. It is important that the flange 26, when attached to the bracket 19, traps the wall 18 between them when the fasteners are attached through apertures 23,28. This allows wall 18 to be of any thickness and it still gets attached without special spacers. It also results in a very strong structure when assembled. At the top and bottom of flange 26 are further fastener apertures 30 which receive fasteners 14 extended through face plate 12 to lock the face plate to the housing and cover over the interior of the housing.

Figure 4:
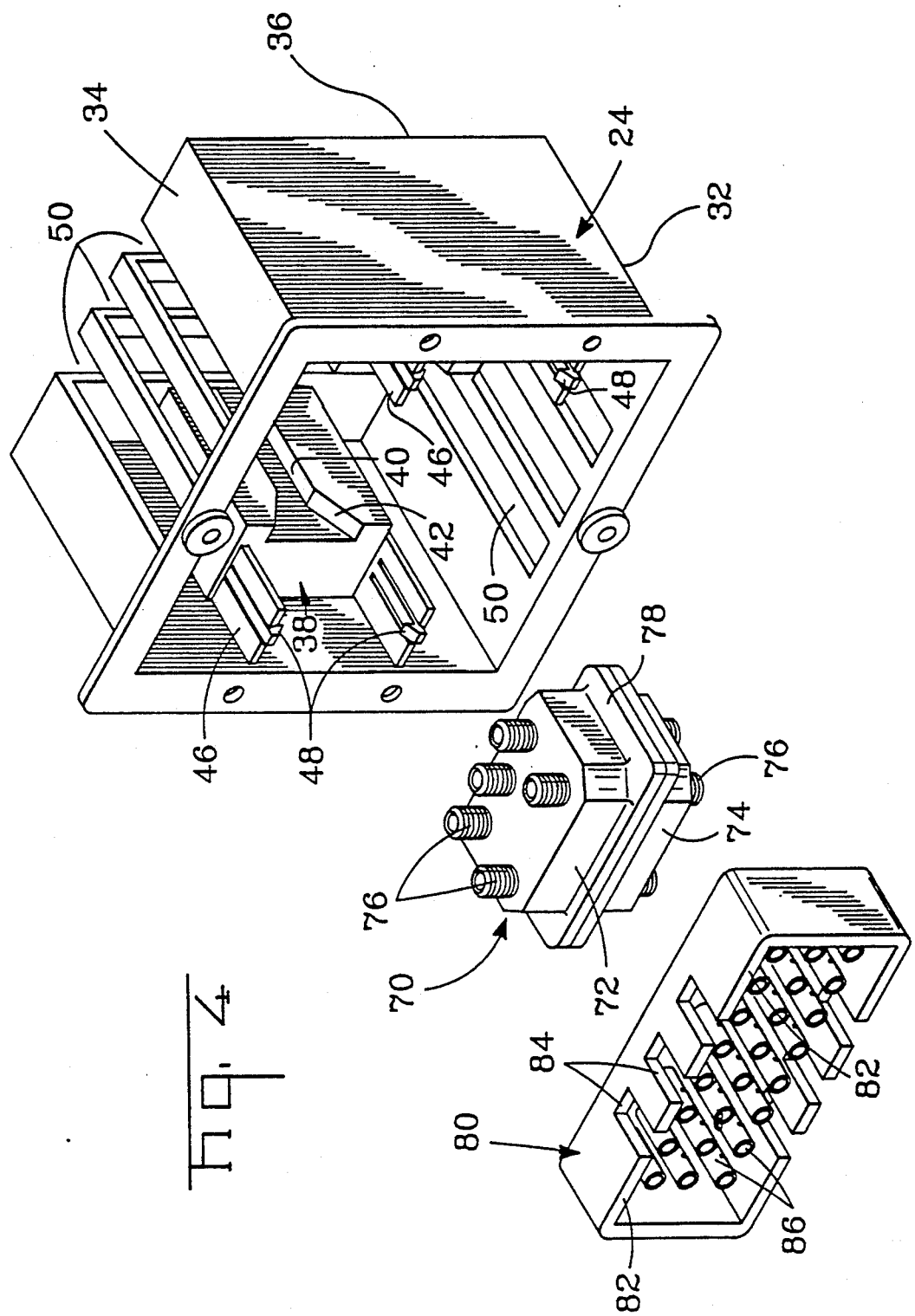
FIG. 4 is a perspective view of the invention housing, electronic module and telephone module unterminated and removed from the housing.
Figure 7:
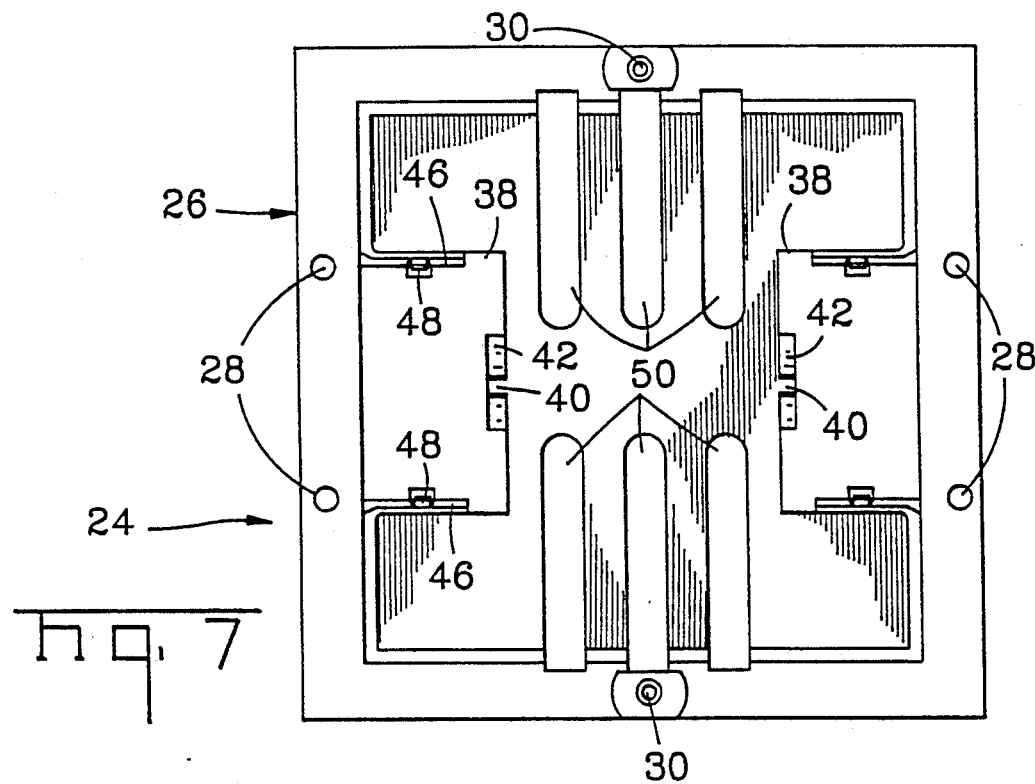
FIG. 7 is a plan view of the housing of the invention.
Figure 8:
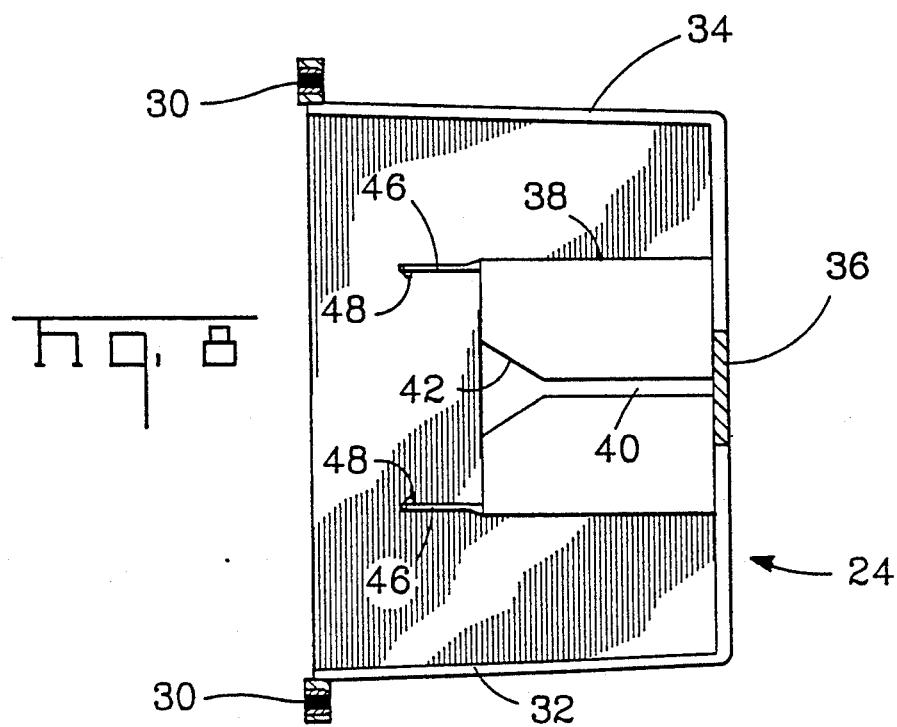
FIG. 8 is a side elevational and partial, sectional view of the housing shown in FIG. 7.

As can be seen in FIGS. 1 and 8, the housing 24 includes, extending rearwardly of the flange 26, a bottom wall 32, a top wall 34, and a back wall 36. Interiorly of housing 24, in the manner shown in FIGS. 4, 7, and 8, are projections of the housing material which include box-like structures 38 which carry, at the inner face, slots 40 beveled as at 42 and positioned to receive electronic modules in the manner to be described. The projections 38 include, as is shown in FIG. 8, elongated latches 46 having latch surfaces 48 at the ends thereof. As can be seen in FIG. 7, the latches 46 extend outwardly relative to the interior of housing 24 and are positioned on both sides of the housing in the manner shown in FIG. 7. As can be seen in FIGS. 4, 5, 7, and 8, the surfaces 32, 34, and 36 of housing 24 include slots 50 which extend across the bottom and top and partially across the back wall 36. These slots have, by virtue of the disposition in the wall surfaces of the housing, a particular advantage, and the slots are made of a width to readily accommodate movement of the cable through the slots and through the interior of the housing facilitating a ready sliding of the cable relative to the housing and relative to being pulled through the housing or pushed back through the housing. However, the width of the slots are of such a dimension as to allow the cable alone to be inserted therethrough into the housing. However, after the connector is installed at the end of the coax cable, it will not slip out, but is trapped, as the width of the connector is greater than said slot dimension. Also, the portions of slots 50 in wall 36 facilitate sliding the housing 24 relative to the cables, to fit the housing onto the wall.

Figure 3:
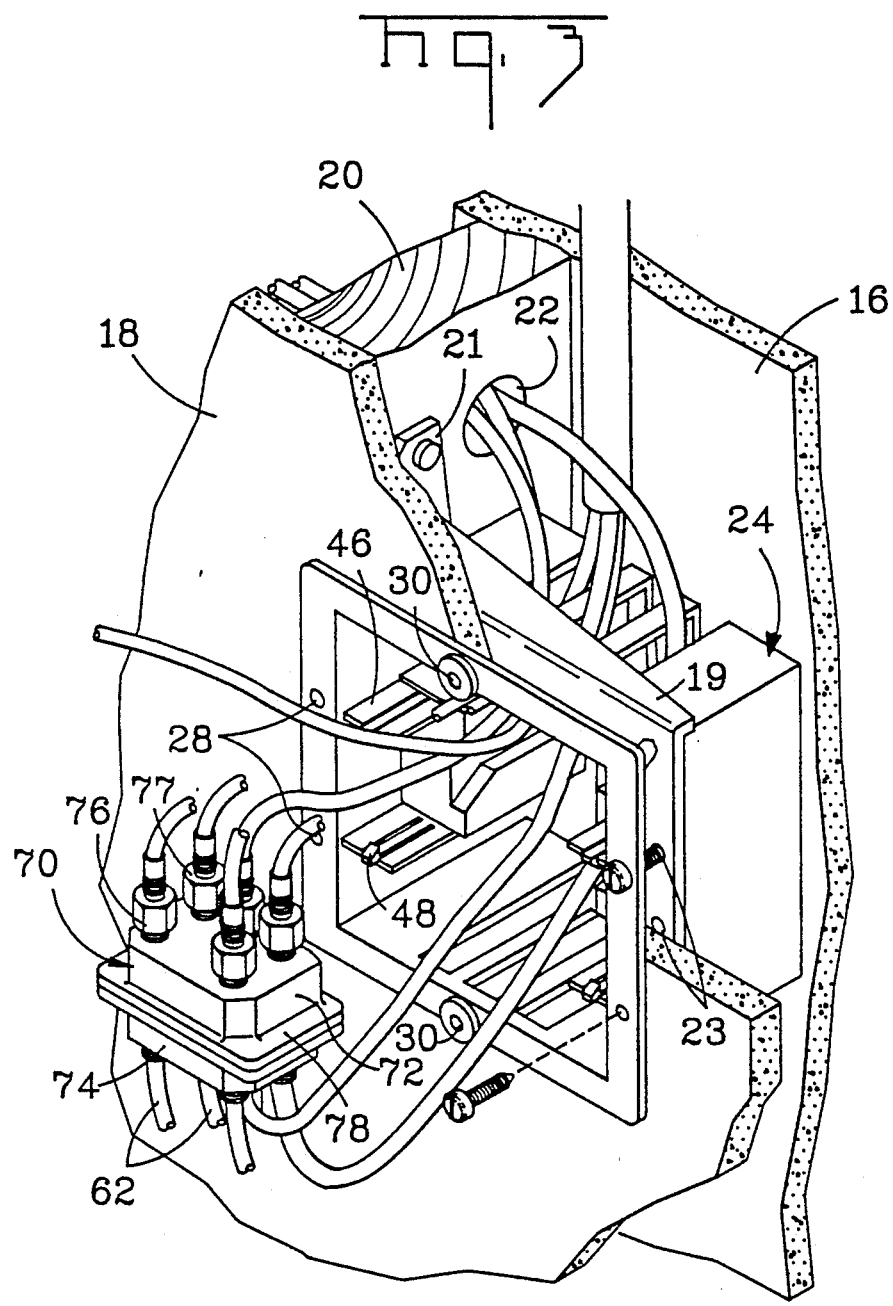
FIG. 3 is a view of the structure of FIG. 2 with the telephone connection removed and the electronic module in the form of a cable splitter removed, with wires attached.
Figure 5:
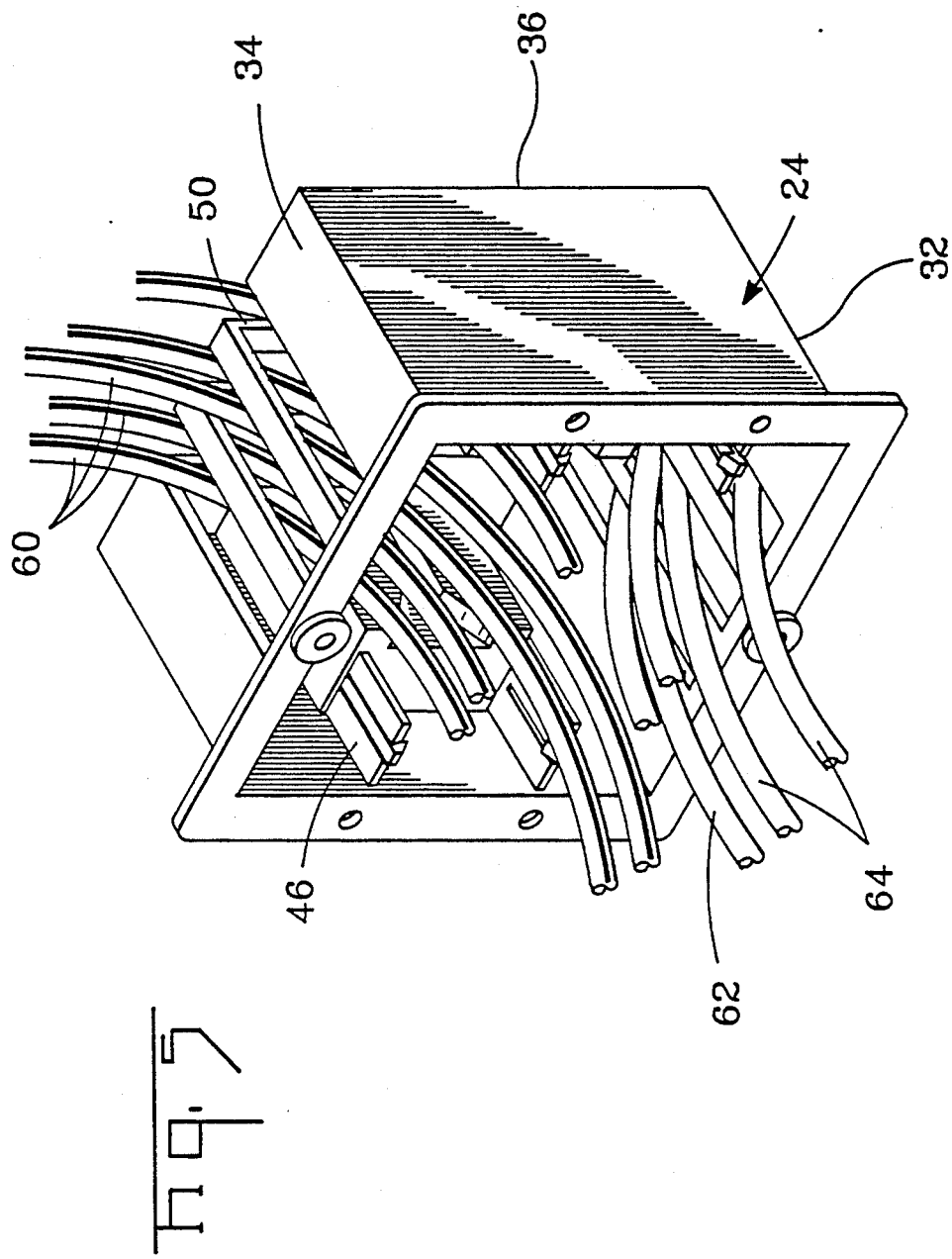
FIG. 5 is a view, in perspective, of the housing of the invention having unterminated cables pulled therethrough with the housing removed from a wall structure.

In accordance with the invention concept then, the various types of cables are pulled through the wall opening in sheet 18 and thereafter pulled through the slots 50 in the housing 24 in the manner shown in FIG. 5. At this point, the various cables, including the coaxial cables 60 and 62, as well as the telephone cable 64, are cut to an appropriate length which will facilitate termination of the cables and a pushing of the housing 24 back into the hole and mounting in bracket 19 with the cables later being pushed into the cavity within the wall. Following trimming, the coaxial cables are terminated by coaxial connector fittings, and the telephone cables are taped together and set aside. Following termination of the coaxial cables with coaxial connectors, such cables are connected to an electronic module 70, as shown in FIGS. 3 and 4. The module 70 includes a pair of coaxial signal splitters 72 and 74 which carry coaxial connector receptacles 76 to receive coaxial connector plugs 77 which are terminated to the end of the cables. The connectors are typical of coaxial connectors, and are widely used for coaxial cable termination. In the example shown in FIGS. 3 and 4, the splitter devices 74 and 76 are of a configuration having a flat flange 78 with each of the splitter devices with such flanges being placed back to back and with the coaxial connectors 76 oppositely oriented. As can be discerned, there are five connectors for each splitter device which, in the preferred embodiment, include one "head end" connector and up to four connectors supplied by a signal fed through the "head end" connector and split into as many as four output channels. In practice, the "head end" connector for one of the splitter devices would be from a source such as a cable, a satellite receiver or some other television receiver split into the desired number of channels and fed out through the comparable number of cables to receivers such as television receivers located in four different building units, house rooms, or apartments of a building structure or the like. The other splitter device 74 may be similarly used with a single input through one of the coaxial connectors which could come, for example, from an interior source to the building such as a video camera or security sensing device to be channeled to four receivers also located within the building. It is to be understood that while the present example is related to coaxial splitter devices, the invention contemplates the opposite wherein signals from the four different input devices are combined into a single output device through an output coaxial connector. Splitter and combined devices are well known and available commercially. To be noted, however, is the arrangement of the electronic module package wherein input and output connectors are arranged in sets with the various connectors for a given set being on the same side of the splitter device.

Following termination of the coaxial cables to coaxial connectors and installation of such connectors with the mating connectors of the splitter devices in the manner shown in FIG. 3, the splitter devices, including particularly the flange elements 78 are fitted interiorly of housing 24 by being fitted inwardly thereof with the flanges 78 slid into the slots 40, the bevel portions 42 guiding such insertion. At this time, the cables terminated to the splitter devices will be pushed to slide through the slots 50 back into the cavity of the wall with relative ease due to the design and dimensioning of the slots 50. In this case, the upper cables 60 will pass through the housing 24 and upwardly into the wall with the cables labeled 62 passing downwardly into the cavity beneath the mounting location of housing 24.

Figure 2:
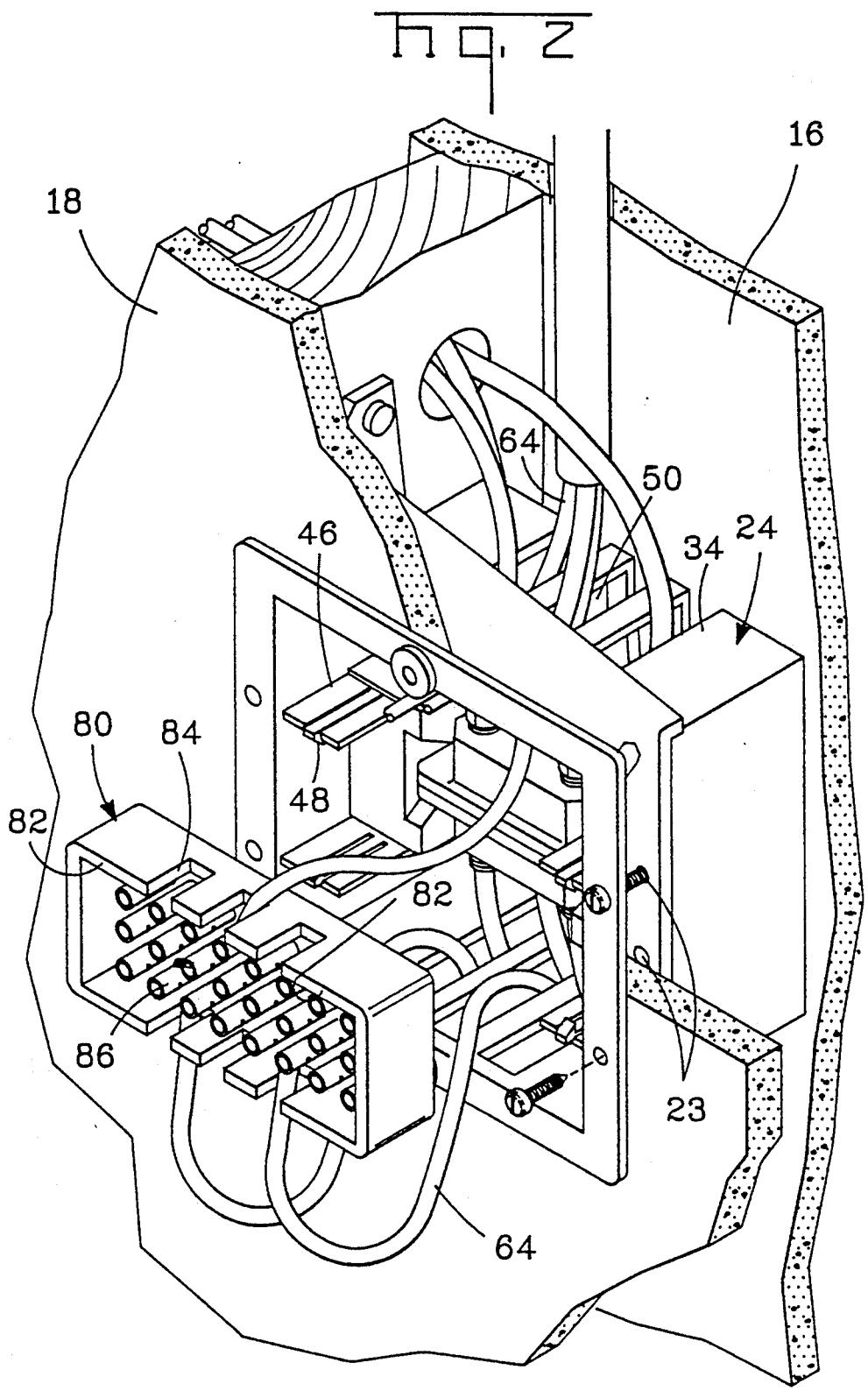
FIG. 2 is a view of the structure of FIG. 1, less the cover plate but with the telephone connector as terminated removed from the housing of the invention.

At this time, the telephone cables may be selectively terminated in telephone distribution block 80, shown in FIGS. 1, 2, and 4. The block 80 includes a plastic housing having side walls 82, cable strain relief slots 84, and a series of individually mounted electrical terminals 86 arrayed in a matrix extending from the floor of the device 80. The terminals 86 may be insulation displacement connection (IDC) type terminals into which insulated telephone wire can be driven to strip such wire and terminate the conductive core of such wire within a slot. As with the splitting devices, the telephone wires may represent inputs from a telephone cable carrying signals to and from the DIU and as well, wires which go out to the individual telephone units in a building. Once termination of the telephone wires is accomplished, the telephone block may be placed within housing 24 by being inserted onto the top of projections 38 with the latch elements 46 receiving the outside walls of the block and with the latches 48 engaging the top edge surfaces of the walls 82 of the block. This is shown, as installed, in FIG. 1 and just prior to installation in FIG. 2. At this time, excess telephone wire will be driven to move through slots 50 into the interior of the wall as with respect to the coaxial cables.

Reviewing installation and referring to FIG. 6, it will be seen that the first step is to pull all cables to be terminated by the DIU through the hole in the interior wall sheet 18. Thereafter, the cables are trimmed to an appropriate length and fed through the housing 24 out of the wall through the slots 50 thereof. The housing 24 is then inserted and fastened to bracket 19 with the slots 50 in the rear wall of the housing facilitating such insertion and manipulation. Thereafter, the coaxial cables are terminated to coaxial connectors which are then attached into the coaxial splitters. The splitter is then slid into position within the housing as described with the coaxial cables further backing into the space in the wall principally above and below the housing 24. Thereafter, the telephone cables may be terminated to the telephone block with the telephone block fitted in the housing as described and finally, after a checkout of circuits, the face plate, including fasteners 14 applied to seal up the interior of the DIU as shown in FIG. 1. In the event changes in coaxial or telephone circuits need be made, additions or removal, the reverse procedures can be used. The installation of coaxial cables first, followed by the more readily bendable telephone cables is preferred.

While the invention has been related to particular types of electronic modules and telephone connectors, it is contemplated that other electronic modules, including particularly for those for data distribution may be employed. It is also contemplated that cables may be placed in a wall with the later installation of circuits following an initial installation which may utilize only one splitter device, another one being added at a later time with the cables both pulled through the slots 50 and pushed back through, with the housing in the wall. In most instances, however, the invention contemplates fitting the cables through the housing with the housing out of the wall and placing the housing back into the wall after it is loaded with splitter devices and a telephone block.

We claim:

1. An electrical cable distribution interface unit for a building structure for mounting within a framework defined by studs and between adjacent ones of the studs and between opposed wall panels to be mounted to said framework, said unit comprising a housing having dimensions permitting mounting within the space bounded by the adjacent studs and the wall panels, said housing at least including side walls and, in at least one of said side walls, a series of slots, each of said slots having width and length to laterally receive a cable inserted therethrough in an easy sliding fit to facilitate extraction during cable termination of sufficient lengths of said cables forwardly of said housing and permitting access to the cable ends for termination thereof to terminals of an electronic module, afterwhich during positioning of said electronic module into said housing said slots enable excess portions of said cable lengths to be manually urged back through said slots and laterally out of said housing and into space within said framework, said housing including affixed therewithin, mounting means to receive and hold said electronic module with at least a set of said cables terminated thereto extending through at least said slots at right angles to the housing wall containing said slots whereby said housing no longer need retain said excess cable portions thus enabling the volume dimension of said housing to be of a reduced size when manufacturing thereof.

2. The electrical cable distribution unit of claim 1 wherein said housing includes a rear wall and said slots extend around and through a substantial portion of said rear wall to facilitate an initial loading of said cables through said slots and said housing for termination to said electronic module.

3. The electrical cable distribution unit of claim 1 wherein said housing includes at least a pair of side walls and a rear wall with slots extending across a substantial portion of the side walls and rear wall to accommodate cable displacement through a side wall and rear wall of said housing.

4. The electrical cable distribution interface unit of claim 1 wherein said mounting means includes grooves disposed internally of said housing to receive said module and the module includes a flange which fits within said groove to allow the module to be slidingly loaded into the interior of said housing.

5. The electrical cable distribution interface unit of claim 1 wherein said unit including an electronic module having a plurality of cable connectors on one side thereof oriented toward one side of said housing to minimize the lengths of cable needed to terminate said connectors within said housing thus enabling said housing dimension to be minimized.

6. The electrical cable distribution interface unit of claim 1 wherein said module includes a cable connector providing signal input and output from said module with said connectors for input and output being arranged on one side of said module.

7. The electrical cable distribution interface unit of claim 1 where said mounting means includes surfaces to mount a pair of modules back to back with each module having a plurality of cable connectors extending from one side with the opposite side thereof having a flat configuration to minimize said dimensions of said housing.

8. The electrical cable distribution interface unit of claim 1 wherein said module is a signal splitter or signal combiner.

9. The electrical cable distribution interface unit of claim 1 wherein there is provided a pair of modules, one for coaxial cable and one for telephone cable having geometries to fit within said housing.

10. The electrical cable distribution interface unit of claim 1 wherein there is included a pair of modules and said mounting means includes a first means to position the first of said modules interiorly of said housing with a further means for positioning the second module overlying the forwardly of said first module within the volume dimension of said housing.

11. The cable distribution unit of claim 1 including a pair of modules each terminate on one side thereof with input and output cables with means for mounting the opposites sides of said modules adjacent one another within said housing to reduce the volume dimension of said housing.

* * * * *